United States Patent Office 2,719,855
Patented Oct. 4, 1955

2,719,855

STEROID ALKALI-METAL ENOLATES

Alan H. Nathan and John A. Hogg, Kalamazoo Township, Kalamazoo County, Mich., assignors to The Upjohn Company, Kalamazoo, Mich., a corporation of Michigan No Drawing. Application August 21, 1952,
Serial No. 305,703

19 Claims. (Cl. 260—397.1)

The present invention relates to certain steroid metal enolates and is more particularly concerned with 21-alkoxyoxalyl - 16 - dehydroprogesterone alkali-metal enolates and to a novel process for the production thereof.

The novel compounds of the present invention may be represented by the following structural formula:

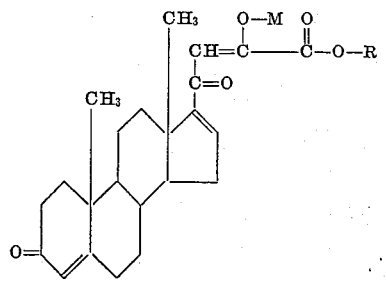

wherein M is an alkali metal and R is alkyl.

The novel process of the present invention involves condensation of 16-dehydroprogesterone with an alkyl di-ester of oxalic acid in the presence of an alkali-metal base to produce a 21-alkoxyoxalyl-16-dehydroprogesterone alkali-metal enolate.

An object of the present invention is to provide novel 21-alkoxyoxalyl-16-dehydroprogesterone alkali-metal enolates. Another object of the present invention is the provision of a process for the production of 21-alkoxyoxalyl-16-dehydroprogesterone alkali-metal enolates. A further object of the present invention is the provision of a process for the production of 21-alkoxyoxalyl-16-dehydroprogesterone alkali-metal enolates without the concomitant formation of alkoxyoxalyl-alkali-metal enolates at other positions of the molecule. Other objects of the present invention will be apparent to those skilled in the art to which this invention pertains.

The novel compounds of the present invention have utility as stable forms of the corresponding keto acids, keeping well, as convenient solids, for long periods of storage. Their water solubility makes these compounds readily adaptable, for further syntheses, to reactions employing aqueous media. The corresponding esters, the acids which can readily be obtained by hydrolysis, and the alkali-metal enolates themselves, have utility as intermediates in the preparation of known steroids, such as, for example, Reichstein's Compound "S" which can be prepared from an alkali-metal enolate of the present invention as described in Example 1A, and physiologically active steroids such as Kendall's Compound "F" (17α-hydroxycorticosterone) which can be prepared from Compound "S" by known methods [Collingsworth et al., J. Am. Chem. Soc., 74, 2381 (1952)].

The novel compounds of the present invention which are of particular interest are those compounds having the above generic formula wherein M is sodium or potassium and R is lower-alkyl such as, for example, methyl, ethyl, propyl, isopropyl, butyl, amyl, hexyl, heptyl, octyl, and the like, with methyl and ethyl being preferred.

The starting compound of the present invention is 16-dehydroprogesterone which may be prepared by known procedure [Butenandt and Schmidt-Thome, Berichte, 72, 182 (1939)].

According to the method of the present invention, a 21-alkoxyoxalyl-16-dehydroprogesterone alkali-metal enolate is prepared by mixing 16-dehydroprogesterone with an alkyl di-ester of oxalic acid in the presence of an alkali-metal base.

In carrying out the process of the present invention, 16-dehydroprogesterone is usually dissolved in the alkanol corresponding to the alkanol used in the formation of the selected ester of oxalic acid, or in a solvent which is non-reactive under the conditions of reaction, such as, for example, benzene or ether, and mixed with the selected alkyl di-ester of oxalic acid in the presence of an alkali-metal base. The di-esters of oxalic acid which are preferred in the method of the present invention are lower-alkyl esters containing from one to eight carbon atoms, inclusive. Of these the methyl and ethyl esters are preferred. Alkali-metal bases which may be used include the alkali-metal alkoxides, the alkali metals, the alkali-metal hydrides, sodium amide, tri-phenyl methyl sodium, and others. Of these the sodium and potassium alkoxides are preferred. The selected alkali-metal base catalyses the condensation of the alkyl ester of oxalic acid with the 16-dehydroprogesterone and contributes the alkali-metal moiety of the alkali-metal enolate. The alkali-metal alkoxide may be used solvent-free, dissolved or suspended in a non-reactive solvent, or in situ in the alkanol in which said alkali-metal alkoxide was formed. When potassium is used, it is usually used as the solution formed by its reaction with tertiary butyl alcohol according to procedure well known in the art.

The resulting reaction mixture is then allowed to stand at a temperature between about zero degrees centigrade and the boiling point of the reaction mixture, preferably at room temperature, for a period of between about one-half hour and about ninety-six hours, usually about one to four hours.

The thus-produced alkali-metal enolate may be separated by the addition of a large volume of an organic solvent in which the alkali-metal enolate is insoluble, such as ether, for example. The thus-recovered 21-alkoxyoxalyl-16-dehydroprogesterone alkali-metal enolate is usually obtained as an amorphous solid, and is a stable form of the corresponding ester. Alternatively, it may be used, without isolation, as an intermediate in the synthesis of the corresponding 21-glyoxalic acid, or as an intermediate for the introduction of a 21-hydroxy or acyloxy group, into 16-dehydroprogesterone, as described in procedure A of Example 1.

The following examples are given to illustrate the method of the present invention and are not to be construed as limiting.

EXAMPLE 1.—SODIUM ENOLATE OF 21-ETHOXYOXALYL-16-DEHYDROPROGESTERONE

To a mixture of 0.85 milliliter of a 3.4 N methanolic sodium methoxide solution, 0.11 milliliter of absolute ethanol, and five milliliters of dry benzene (said mixture previously having been distilled until two milliliters of distillate had been collected, and then cooled), was added 0.6 milliliter of ethyl oxalate and a solution of 0.81 gram of 16-dehydroprogesterone in 9.5 milliliters of dry benzene. The solution became turbid and an orange precipitate formed. The reaction mixture was stirred for ninety minutes, sixteen milliliters of ether was then added thereto, and stirring was continued for sixty minutes, whereafter a 33-milliliter portion of ether was added thereto and the whole was stirred for an additional six hours. The thus-formed orange precipitate of the sodium enolate of 21-ethoxyoxalyl-16-dehydroprogesterone was filtered, washed with several portions of ether, and after drying found to weigh 0.861 gram, a yield of 77 percent of the theoretical. The presence of a sodium enolate was verified by the extreme solubility of the product in water and by a positive ferric chloride test for enols as exhibited by the formation of a bright red color when the product was dissolved in alcoholic and aqueous ferric chloride solutions. The structure was further verified by infrared and ultraviolet absorption spectra analyses which were consistent with the structure.

A. *21-acetoxy-16-dehydroprogesterone (21-acetoxy-4,16-pregnadiene-3,20-dione)*

Treatment of a solution of the sodium enolate of 21-ethoxyoxalyl-16-dehydroprogesterone in absolute methanol cooled to about minus twenty degrees centigrade with about a molar equivalent of iodine in methanol over a period of about an hour, and thereafter treating the mixture with about a molar equivalent of sodium methoxide in methanol, stirring for about an hour, and thereafter adding water thereto, is productive of a reddish precipitate of 21-iodo-16-dehydroprogesterone.

Treatment of the thus-produced moist 21-iodo-16-dehydroprogesterone in acetone with a large excess of potassium bicarbonate in acetic acid for several hours at the reflux temperature of the reaction mixture is productive of 21-acetoxy-16-dehydroprogesterone, which can be precipitated by distilling the acetone and adding a large volume of water to the residue, and purified by fractional crystallization or chromatography on a column of magnesium silicate.

21-acetoxy-16-dehydroprogesterone can be converted to Reichstein's Compound "S" in the following manner: Treatment of 21-acetoxy-16-dehydroprogesterone at about zero degrees centigrade with about a three molar equivalent excess of hydrogen peroxide in ethanol in the presence of a catalytic amount of aqueous sodium hydroxide is productive, after about a mole of hydrogen peroxide has been absorbed, of 21-acetoxy-16(17)-oxido-progesterone [16(17)-oxido-21-acetoxy-4-pregnene-3,20-dione] which can be converted, by treatment with dry hydrogen bromide in chloroform and thereafter with a large excess of Raney nickel in refluxing alcohol to Reichstein's Compound "S" (17α-hydroxy-21-acetoxy-4-pregnene-3,20-dione).

EXAMPLE 2.—POTASSIUM ENOLATE OF 21-ETHOXYOXALYL-16-DEHYDROPROGESTERONE

Using essentially the procedure described in Example 1, 16-dehydroprogesterone is converted to the potassium enolate of 21-ethoxyoxalyl-16-dehydroprogesterone by reaction with ethyl oxalate and potassium in tertiary butyl alcohol. The resulting potassium enolate is converted, as with the corresponding sodium enolate, to 21-acetoxy-16-dehydroprogesterone, according to the procedure of Example 1A.

EXAMPLE 3.—SODIUM ENOLATE OF 21-METHOXYOXALYL-16-DEHYDROPROGESTERONE

Using essentially the procedure described in Example 1, 16-dehydroprogesterone is converted to the sodium enolate of 21-methoxyoxalyl-16-dehydroprogesterone by reaction with methyl oxalate and sodium in absolute methanol. The resulting sodium enolate is converted, as with the 21-ethoxyoxalyl derivative, to 21-acetoxy-16-dehydroprogesterone, according to the procedure of Example 1A.

EXAMPLE 4.—POTASSIUM ENOLATE OF 21-METHOXYOXALYL-16-DEHYDROPROGESTERONE

Using essentially the procedure described in Example 1, 16-dehydroprogesterone is converted to the potassium enolate of 21-methoxyoxalyl-16-dehydroprogesterone by reaction with methyl oxalate and potassium in tertiary butyl alcohol. The resulting potassium enolate is converted, as with the corresponding sodium enolate, to 21-acetoxy-16-dehydroprogesterone according to the procedure of Example 1A.

EXAMPLE 5.—SODIUM ENOLATE OF 21-PROPOXYOXALYL-16-DEHYDROPROGESTERONE

Using essentially the procedure described in Example 1, 16-dehydroprogesterone is converted to the sodium enolate of 21-propoxyoxalyl-16-dehydroprogesterone by reaction with propyl oxalate and sodium in propyl alcohol. The resulting sodium enolate is converted, as with the 21-ethoxyoxalyl derivative, to 21-acetoxy-16-dehydroprogesterone, according to the procedure of Example 1A.

EXAMPLE 6.—SODIUM ENOLATE OF 21-ETHOXYOXALYL-16-DEHYDROPROGESTERONE

Using essentially the procedure described in Example 1, 16-dehydroprogesterone is converted to the sodium enolate of 21-ethoxyoxalyl-16-dehydroprogesterone, by reaction with ethyl oxalate and sodium amide in benzene.

In a manner similar to Examples 1 through 6, the following compounds are prepared by reaction of 16-dehydroprogesterone with the appropriate alkyl oxalate and sodium or potassium alkoxide in an alkanol or non-reactive solvent medium: sodium enolate of 21-butoxyoxalyl-16-dehydroprogesterone, sodium enolate of 21-amyloxyoxalyl-16-dehydroprogesterone, sodium enolate of 21-hexyloxyoxalyl-16-dehydroprogesterone, sodium enolate of 21-heptyloxyoxalyl - 16 - dehydroprogesterone, sodium enolate of 21-octyloxyoxalyl-16-dehydroprogesterone, the potassium analogues of these and like compounds, and others.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. 21 - alkoxyoxalyl - 16 - dehydroprogesterone alkalimetal enolate, represented by the following formula:

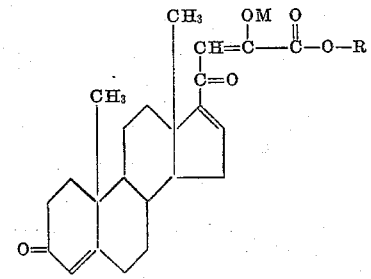

wherein M is an alkali-metal, R is lower-alkyl and wherein the alkyl radical of the alkoxy group contains from one to eight carbon atoms, inclusive.

2. The sodium enolate of 21-alkoxyoxalyl-16-dehydroprogesterone, represented by the following formula:

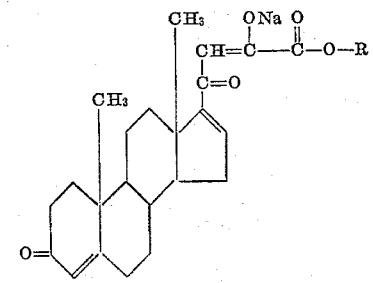

wherein R is lower-alkyl and wherein the alkyl radical of the alkoxy group contains from one to eight carbon atoms, inclusive.

3. The potassium enolate of 21-alkoxyoxalyl-16-dehydroprogesterone, represented by the following formula:

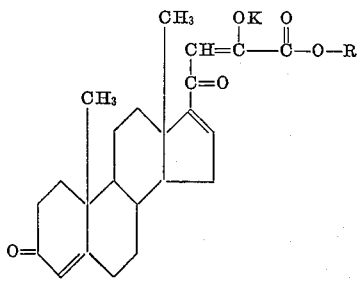

wherein R is lower-alkyl and wherein the alkyl radical of the alkoxy group contains from one to eight carbon atoms, inclusive.

4. The sodium enolate of 21-methoxyoxalyl-16-dehydroprogesterone.

5. The sodium enolate of 21-ethoxyoxalyl-16-dehydroprogesterone.

6. The potassium enolate of 21-methoxyoxalyl-16-dehydroprogesterone.

7. The potassium enolate of 21-ethoxyoxalyl-16-dehydroprogesterone.

8. The sodium enolate of 21-propoxyoxalyl-16-dehydroprogesterone.

9. A process for the production of 21-alkoxyoxalyl-16-dehydroprogesterone alkali-metal enolate which includes the step of mixing 16-dehydroprogesterone with an alkyl di-ester of oxalic acid in the presence of an alkali-metal base, and continuing the reaction at a temperature between about zero degrees centigrade and the boiling point of the reaction mixture, to produce the desired 21-alkoxyoxalyl-16-dehydroprogesterone alkali-metal enolate.

10. A process for the production of 21-alkoxyoxalyl-16-dehydroprogesterone alkali-metal enolate which includes: mixing 16-dehydroprogesterone with an alkyl di-ester of oxalic acid wherein the alkyl radicals of the di-ester of oxalic acid each contain from one to eight carbon atoms, inclusive, in the presence of an alkali-metal base, continuing the reaction at a temperature between about zero degrees centigrade and the boiling point of the reaction mixture, and separating the thus-produced 21-alkoxyoxalyl-16-dehydroprogesterone alkali-metal enolate.

11. A process for the production of 21-alkoxyoxalyl-16-dehydroprogesterone alkali-metal enolate which includes: mixing 16-dehydroprogesterone with an alkyl di-ester of oxalic acid in the presence of an alkali metal alkoxide, wherein the alkyl radicals of the di-ester of oxalic acid and the alkali-metal alkoxide each contain from one to eight carbon atoms, inclusive, and separating the thus-produced 21-alkoxyoxalyl-16-dehydroprogesterone alkali-metal enolate.

12. A process for the production of 21-alkoxyoxalyl-16-dehydroprogesterone alkali-metal enolate which includes: mixing 16-dehydroprogesterone with an alkyl di-ester of oxalic acid in the presence of a solution of an alkali metal in an alkanol, the alkyl radicals of the di-ester of oxalic acid and the alkanol each containing from one to eight carbon atoms, inclusive, continuing the reaction at a temperature between zero degrees centigrade and the boiling point of the reaction mixture, and separating the thus-produced 21-alkoxyoxalyl-16-dehydroprogesterone alkali-metal enolate.

13. A process for the production of the sodium enolate of 21-ethoxyoxalyl-16-dehydroprogesterone which includes: mixing 16-dehydroprogesterone with diethyl oxalate in the presence of sodium ethoxide, continuing the reaction at a temperature between about room temperature and the boiling point of the reaction mixture, and separating the thus-produced sodium enolate of 21-ethoxyoxalyl-16-dehydroprogesterone.

14. A process for the production of the sodium enolate of 21-methoxyoxalyl-16-dehydroprogesterone which includes: mixing 16-dehydroprogesterone with dimethyl oxalate in the presence of sodium methoxide, continuing the reaction at a temperature between about room temperature and the boiling point of the reaction mixture, and separating the thus-produced sodium enolate of 21-methoxyoxalyl-16-dehydroprogesterone.

15. A process for the production of the potassium enolate of 21-ethoxyoxalyl-16-dehydroprogesterone which includes: mixing 16-dehydroprogesterone with diethyl oxalate in the presence of a solution of potassium in tertiary butyl alcohol, continuing the reaction at a temperature between about room temperature and the boiling point of the reaction mixture, and separating the thus-produced potassium enolate of 21-ethoxyoxalyl-16-dehydroprogesterone.

16. A process for the production of the potassium enolate of 21-methoxyoxalyl-16-dehydroprogesterone which includes: mixing 16-dehydroprogesterone with dimethyl oxalate in the presence of a solution of potassium in tertiary butyl alcohol, continuing the reaction at a temperature between about room temperature and the boiling point of the reaction mixture, and separating the thus-produced potassium enolate of 21-methoxyoxalyl-16-dehydroprogesterone.

17. A process for the production of the sodium enolate of 21-propoxyoxalyl-16-dehydroprogesterone which includes: mixing 16-dehydroprogesterone with dipropyl oxalate in the presence of sodium propoxide, continuing the reaction at a temperature between about room temperature and the boiling point of the reaction mixture, and separating the thus-produced sodium enolate of 21-propoxyoxalyl-16-dehydroprogesterone.

18. The process of claim 9 wherein the amount of alkali-metal base employed is about one molar equivalent, calculated on the 16-dehydroprogesterone.

19. The process of claim 13 wherein the amount of alkali-metal base employed is about one molar equivalent, calcualted on the 16-dehydroprogesterone.

References Cited in the file of this patent
UNITED STATES PATENTS

| | | |
|---|---|---|
| 2,265,417 | Bockmuhl | Dec. 9, 1941 |
| 2,554,473 | Ruschig | May 22, 1951 |

FOREIGN PATENTS

| | | |
|---|---|---|
| 891,441 | France | 1944 |